United States Patent Office 2,980,699
Patented Apr. 18, 1961

2,980,699

DIHYDROPYRANOCOUMARIN DERIVATIVES AND PROCESS FOR THEIR PRODUCTION

Eric Smith, Fairlawn, and Norman Hosansky, Newark, N.J., assignors to S. B. Penick and Company, New York, N.Y., a corporation of Delaware No Drawing. Filed Dec. 20, 1957, Ser. No. 704,008

11 Claims. (Cl. 260—343.2)

Our invention relates to new derivatives of dihydropyrano (7,8:6'5')-coumarin and processes for their production.

The compounds of the invention have the following general structural formula. It will be noted that the 7-position carbon atom of the coumarin moiety is also the 6'-position carbon atom of the fused dihydropyrano moiety. Also, the 8-position carbon atom of the coumarin moiety is the 5'-position carbon atom of the fused dihydropyrano moiety:

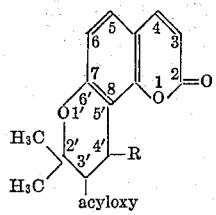

wherein R is a lower-alkoxy radical or a halogen atom.

Compounds having the above nucleus have been found to exist in extracts of the seeds of *Ammi visnaga* where the substituent in the 4'-ring position is acetoxy and the substituent in the 3'-position is one of the three acyloxy radicals. The invention here resides primarily in the concept of a molecular structure as above illustrated in which the 4' position acetoxy radical is replaced by a lower-alkoxy radical or a halogen atom and the acyloxy group in the 3' position can be any selected acyloxy radical.

The compounds of the invention have pharmacological utility in that they have vasodilator activity, measured by the coronary flow in the isolated rabbit heart, ranging up to ten times the effect of khellin.

It is known that the extraction of the seed of *Ammi visnaga* L. yields an amorphous, ether-soluble, visnagan fraction as a by-product in the preparation of khellin. One of us (Smith) and another coworker (Karl K. Haber) have isolated from this fraction three crystalline substances which are termed visnadin, samidin, and dihydrosamidin. These crystalline substances were obtained by chromatographing a purified benzene extract of the seeds of *Ammi visnaga* L. After concentration of a benzene extract of said seeds, the concentrate is treated in a conventional manner to remove coloring matter, fatty constituents, solvents, and components capable of forming oxonium salts. The remaining amorphous material is then chromatographed with substantially water-insoluble organic solvents of increasing polarity, such as pentane followed by pentane-ether mixtures of increasing ether content, on an adsorbent, such as silica gel, employed in an amount of not less than about ten times the amount of amorphous material. In this manner the purified amorphous visnagan fraction is separated into said crystallizable components in one operation.

The crystalline substance visnadin has the empirical formula $C_{21}H_{24}O_7$. It melts at 85–87 degrees centigrade and has a specific rotation of +8 degrees in alcohol and +38 degrees in dioxane. The empirical formula of samidin is $C_{21}H_{22}O_7$. It melts at 135 degrees to 137 degrees centigrade and has a specific rotation of +27 degrees in alcohol and +101 degrees in dioxane.

Dihydrosamidin has an ultimate analysis of $C_{21}H_{24}O_7$. It melts at 117–119 degrees centigrade and has a specific rotation of +19 degrees in alcohol and +63.6 degrees in dioxane. As a consequence of the preparation of the compounds herein claimed we have been able to identify the structure of the hitherto unknown substances from said visnagan fraction as follows: visnadin is 2',2'-dimethyl - 3'-(alphamethyl-butyryloxy)-4'-acetoxy-dihydropyrano (7,8:6'5')-coumarin; samidin is 2',2'-dimethyl-3'-(beta, beta - dimethyl-acryliloxy)-4'-acetoxy-dihydropyrano (7,8:6',5')-coumarin; and dihydrosamidin is 2',2'-dimethyl - 3' - isovaleryloxy - 4'-acetoxy-dihydropyrano (7,8:6',5')-coumarin.

The preparation of the compounds of the present invention follows the general procedure of treating the aforesaid crystalline components from the visnagan fraction of an extract of the seeds of *Ammi visnaga* L. with alcoholic alkali, acidifying the reaction mixture, and diluting it with water and extracting and removing the solvent from the reaction product. This treatment introduces an alkoxyl group into the 4' position of the dihydropyrano group and may also produce a free hydroxyl group at the 3' position, depending on the operating conditions of the process. Thus, the alkoxyl group appears in the 4' position when the treatment with alcoholic alkali is conducted with or without external heating of the reaction mixture, but the free hydroxyl group is formed simultaneously only when external heat is applied to the reaction mixture. The free hydroxyl group can then be esterified.

In conducting the above-described general procedure, we prefer to use the $C_1$ to $C_4$ aliphatic alcohols in preparing the alcoholic alkali reactant. Thus, methyl alcohol, ethyl alcohol, isopropyl alcohol, n-butyl alcohol, tertiary butyl alcohol, et cetera, may be employed. Other aliphatic alcohols of longer chain lengths can also be used. The hydroxides of sodium, potassium, or ammonium, may be employed, as the alkali, and any form of alkaline substance soluble in alcohol is satisfactory.

The alkoxylation reaction occurs at room temperature and below and continues above 25 degrees centigrade. However, the formation of the hydroxyl group at the 3' position of the dihydropyran ring begins at about 25 degrees centigrade and is accelerated by the application of external heat to the reaction mixture, as under reflux. If it is desired to introduce only the alkoxyl group in the 4' position, it is preferable to use about one to two moles of alkali for a mole of starting material at about room temperature. In order to form the hydroxyl group simultaneously, it is necessary to use at least three moles of alkali for each mole of initial material under reflux.

When the first reaction is completed, the reaction product is acidified with any suitable mineral acid such as hydrochloric, sulfuric, et cetera, to a pH concentration of about five, for example, and the acidified solution is then diluted with water and extracted with an organic solvent, preferably one which is substantially immiscible with the acidified diluted alcoholic solution, such as ether or chloroform. Thereafter, the solvent is removed by evaporation.

In the event the reaction has been so conducted as to form a hydroxy group at the 3' position of the dihydropyran ring, the hydroxyl group can be esterified while leaving the lower-alkoxy group at the 4' position unchanged, by treatment with the anhydrides of organic acids, such as acetic anhydride.

In order to produce the compounds of the invention wherein the 3'-position substituent is acyloxy and the 4'-position substituent is a halogen atom, the intermediate compound wherein the 3'-position substituent is hydroxyl and the 4'-position substituent is a lower-alkoxy group is reacted with an acyl halide. It has now been discovered that the halogen atom displaces the lower-alkoxy group from the 4'-position and the acyl group forms an ester at the 3'-position.

By the term "lower-alkoxy," as used herein, is meant the radical —O—$C_nH_{2n+1}$, wherein $n$ is an integer from 1 to 4, inclusive, for example, methoxy, ethoxy, isopropoxy, n-butoxy, tertiary butoxy, et cetera.

By the term "acyloxy" as used herein is meant the radical —OC(O)—R, wherein R is an organic radical. A wide variety of these acyloxy radicals are known in the art. Such radicals are derived from organic monocarboxylic acids and include, by way of illustration only, lower aliphatic acyloxy radicals as acetoxy, propioionyloxy, butyryloxy, n-valerloxy, iso-valeryloxy, alpha-methyl-butyryloxy, acrylyloxy, beta beta-dimethyl-acrylyloxy, crotonyloxy, iso-crotonyloxy, beta-chloro-propionyloxy, beta - methoxy - propionyloxy, gamma-nitro-butyryloxy, beta - amino - propionyloxy, gamma-nitroso-butyryloxy, beta - mercapto-butyryloxy, delta-carb-ethoxyvaleryloxy; aromatic acyloxy radicals as benzoyloxy, methyl-benzoyloxy, nitro-benzoyloxy, nitroso benzoyloxy, mercapto-benzoyloxy, amino-benzoyloxy, carbo-methoxy-benzoyloxy, para-hydroxy-benzoyloxy; cycloaliphatic acyloxy radicals as hexahydrobenzoyloxy, alpha-cyclohexyl-acetoxy, ortho-chloro-hexahydrobenzoyloxy, para-nitro-alpha-cyclohexyl-acetoxy; heterocyclic acyloxy radicals as alpha, beta-epoxy propionyloxy, alpha-(2-pyridyl)-acetoxy, alpha-(2-thienyl)-acetoxy, et cetera.

By the term "halogen atom," as used herein, is meant the chlorine, bromine, iodine and fluorine atoms.

In the term "acyl halide," as used herein, "acyl" is the radical R—C(O)— wherein R is an organic radical. A wide variety of these acyloxy radicals are known in the art and illustrative examples are the acyl radicals derived by removing the terminal oxygen atom from the foregoing list of "acyloxy" radicals. "Halide" is inclusive of the chlorides, bromides, iodides and fluorides.

The following illustrates the preparation of the starting materials of visnadin, dihydrosamidin, and samidin from visnagan.

*Purification of visnagan.*—About ten pounds of visnagan prepared according to Samaan, Quarterly Journal of Pharmacy and Pharmacology, London, volume 4, page 14 (1931); volume 6, page 12 (1933); volume 18, page 83 (1945) was mixed with six gallons of pentane and this solution extracted repeatedly with 80 percent alcohol using 6, 2 and 2 gallons respectively. The alcoholic layers were separated, washed once with pentane and concentrated in vacuo. The residue was diluted with 2 gallons of water and extracted with ether. The combined ether extracts were dried over anhydrous sodium sulfate, filtered and gaseous hydrochloric acid passed through the solution under cooling as long as oxonium salts precipitated. The ether solution was filtered, washed acid-free with sodium carbonate solution, then washed with water, dried over anhydrous sodium sulfate and concentrated; 160 grams of clear brown oil remained. This fraction had an optical activity of +22 degrees.

*Chromatography of visnagan.*—Seven pounds of the refined oil was diluted with 5 pounds of ether and mixed into 7 pounds of Filter-cel. The mix was air-dried, put through a screen and then added to a column containing 127 pounds of silica (J. F. Smith) which had previously been covered with pentane. The column was developed and cut, according to the following scheme: (1) Fifteen gallons of pentane which eluted 690 grams of oil not further investigated. (2) Fifty gallons of an ether-pentane mixture containing 10 to 20 percent ether. This eluted 59 grams of a non-crystalline oil with an optical activity of +55 degrees. The oil, rubbed up with alcohol, gave 24 grams of crystals which, after repeated recrystallizations from alcohol, melted at 285–287 degrees centigrade and had an optical activity (alpha) D of +69 degrees. This fraction was followed by a bright yellow eluate which on concentration gave 113 grams of oil which, when rubbed up with ether, gave 10 grams of bright yellow crystals ("yellow body") melting, after repeated crystallizations from methanol, at 176–178 degrees centigrade, and having an ultraviolet absorption spectrum with a maximum at 293 m$\mu$ (E$_1^1$ 1580)

(3) Thirty gallons of ether pentane (1:3). The eluate began to show the typical ultraviolet absorption spectrum of the dihydrofurocoumarins; an absorption minimum at 268 m$\mu$ and an absorption maximum at 320 m$\mu$. At the same time, the absorption was taken at 220 m$\mu$. As long as the eluate showed an absorption ratio of 322 m$\mu$:222 m$\mu$ of 1–1.7:1 and 322 m$\mu$:262 m$\mu$ of 2–4:1, it was collected for the preparation of visnadin. A total throughput of 75 gallons was collected, concentrated to 5 gallons and allowed to crystallize for a week in the ice-box. There was thus obtained 236 grams of crude visnadin, melting at 75–78 degrees centigrade and having an optical activity of +12 degrees, and 190 grams of oil with an optical activity of +10 degrees. (4) The next fraction was collected until the ratio 322 m$\mu$:220 m$\mu$ had risen to about 6:1. This fraction eluted samidin. It required about 30 gallons of ether pentane (1:3) and 40 gallons of ether-pentane (3:7). The combined eluates were concentrated to 6 gallons and allowed to crystallize; 320 grams of crude samidin, melting at 127–135 degrees centigrade and having an optical activity of +20 degrees, and 220 grams of a non-crystallizable oil were recovered from this fraction. (5) At this point the ultraviolet absorption spectrum of the eluate showed a distinct shift of the minimum from 262 to 270 m$\mu$ and of the maximum from 320 to 300 m$\mu$. Further elution with ether-pentane (1:1) resulted in the isolation of visamminol. Fifty gallons of eluate was needed for total removal and gave, on concentrating to 5 gallons, 215 grams of visamminol and 200 grams of non-crystallizable oil. Further increase in the ether concentration resulted in the elution of 110 grams of visnagin and an additional 270 grams of oil.

*Visnadin.*—The crude fraction (236 grams) was dissolved in 500 milliliters of ether, charcoaled, 600 milliliters of hexane was added; the solution was concentrated to 600 milliliters and allowed to crystallize. The 200 grams of visnadin so obtained was once more crystallized and gave 160 grams of white needles, melting at 84–86 degrees centigrade and having an optical activity, (alpha) D of +9 degrees (c, 2.0) and +38 degrees (c. 1.0 in dioxane). In a volatile acid determination, 46.0 milligrams yielded an amount of acid equivalent to 11.29 milliliters of 0.02 N sodium hydroxide; calculated for two acids, 11.75 milliliters.

*Analysis.*—Calculated for $C_{21}H_{24}O_7$: C, 64.95; H, 6.23. Found: C, 65.04; H, 6.19.

*Dihydrosamidin.*—The mother liquors of the visnadin recrystallizations were concentrated to half-volume and an additional small amount impure visnadin was isolated. They were then taken down to dryness and rubbed up with 20 milliliters of ether and allowed to crystallize in the ice-box; 6 grams of crystals were obtained which, when recrystallized from 90 percent methanol, gave 5 grams of pyramids, melting at 117–119 degrees centigrade and having an optical activity (alpha) D of +19 degrees (c. 1.0) and +63 degrees (c. 1.0 in dioxane). On volatile acid determination, 84.8 milligrams used 22.08 milliliters of 0.02 N sodium hydroxide; calculated for two acids, 21.86 milliliters.

*Analysis.*—Calculated for $C_{21}H_{24}O_7$: C, 64.95; H, 6.23. Found: C, 64.91; H, 6.09.

*Samidin.*—The 320 grams of crude samidin was repeatedly crystallized from alcohol to give 250 grams of pure material as cubes, melting at 135–137 degrees centigrade, and having an optical activity (alpha) D of +26 degrees (c. 1.0) and +100 degrees (c. 1.0 in dioxane). In a volatile acid determination 40.6 milligrams used 9.99 milliliters of 0.02 N sodium hydroxide, calculated for two acids 10.51 milliliters.

Analysis.—Calculated for $C_{21}H_{22}O_7$: C, 65.27; H, 5.74. Found: C, 65.21; H, 5.53.

Further disclosure of the method of preparation of the starting materials is found in application Serial No. 391,594, filed November 12, 1953, by Eric Smith et al., Isolation of Crystalline Components From Visnagan, now United States Patent Number 2,816,118.

The following examples illustrate our invention:

*Example 1.—Treatment with ethanolic alkali at about 20–25 degrees centigrade*

Twenty grams (0.052 mole) of samidin was dissolved in 90 milliliters of ethanol containing 5.2 grams (0.13 mole) of sodium hydroxide. After standing at room temperature for 60 minutes, water (2 liters) and then 5 N sulfuric acid to pH 5 were added. The milky white suspension was shaken into ether, the ethereal solution was washed with dilute potassium carbonate then with water, dried over sodium sulfate, filtered and evaporated to dryness. The residue was twice recrystallized from methanol-ether and identified as 2′,2′-dimethyl-3′-(beta, beta - dimethyl - acryloxy) - 4′ - ethoxy - dihydropyrano (7,8:6′,5′)-coumarin. The compound may hereafter be identified by the following properties: it melts at 92–94 degrees centigrade; has an optical rotation of +99±1 degree in alcohol; and, its ultraviolet absorption spectrum in alcoholic solution has a maximum at 326 m$\mu$ and a minimum at 264 m$\mu$.

Analysis.—Calculated for $C_{21}H_{24}O_6$: C, 67.73; H, 6.50. Found: C, 67.81; H, 6.51.

*Example 2.—Treatment with ethanolic alkali at room temperature*

Samidin (5 grams) was dissolved in 45 milliliters of ethanol and 45 milliliters of 1 N sodium hydroxide in ethanol was added. The solution was allowed to stand at room temperature and its rotation taken every 10 minutes. The rotation increased for about 45 minutes, after which the solution was diluted with 1 liter of water, acidified with sulfuric acid and extracted with ether. The ether solution was backwashed with dilute sodium carbonate solution, dried and concentrated. The residue was twice crystallized from 80 percent methanol and gave 3 grams of 2′,2′-dimethyl-3′-(beta, beta-dimethylacryloxy) - 4′ - ethoxy-dihydropyrano (7,8:6′,5′)-coumarin, melting at 91–93 degrees, having an optical rotation (alpha) D +99 degrees (c. 0.9); and having an ultraviolet absorption spectrum maximum at 326 m$\mu$ (4.16), and a minimum at 264 m$\mu$ (3.42). On volatile acid determination 47.7 milligrams of substance used 5.92 milliliters 0.02 N sodium hydroxide; calculated for 1 acid 6.4 milliliters.

Analysis.—Calculated for $C_{21}H_{24}O_6$ (372.4): C, 67.73; H, 6.50. Found: C, 67.81; H, 6.51.

*Example 3.—Treatment with ethanolic alkali at raised temperatures*

A twenty percent ethanolic solution of samidin was mixed with an equal volume of 2 N sodium hydroxide in ethanol and the resulting yellow solution was refluxed on a steam bath for 90 minutes. The solution was then concentrated in vacuo to one-half of its volume, the concentrate was diluted with ten volumes of water and then acidified with 6 N hydrochloric acid. After standing overnight in the ice box the insoluble material was extracted with ether; the ethereal solution was washed with dilute potassium carbonate and with water, dried over sodium sulfate, filtered and evaporated to dryness. The residue was twice recrystallized from acetone-hexane and identified as 2′,2′-dimethyl-3′-hydroxy-4′-ethoxy-dihydropyrano (7,8:6′,5′)-coumarin. The properties by which this compound may hereinafter be identified are: it melts at 162–163 degrees centigrade; has an optical rotation of −60±1 degree in alcohol; and its ultraviolet absorption spectrum in alcoholic solution has a maximum at 325 m$\mu$ and a minimum at 266 m$\mu$.

Analysis.—Calculated for $C_{16}H_{18}O_5$: C, 66.19; H, 6.25; $OC_2H_5$, 15.52. Found: C, 66.20; H, 6.11; $OC_2H_5$, 16.00.

Instead of samidin we can employ visnadin dihydrosamidin or oils high in samidin dihydrosamidin and visnadin content as initial materials in the process of Example 3. They also yield the aforedescribed hydroxyl compound.

*Example 4.—Hot ethanolic alkaline hydrolysis*

Twenty-five grams of samidin in ethanol was refluxed with 165 milliliters of 2 N alcoholic sodium hydroxide for 1.5 hours. The orange colored solution was cooled, diluted with water, concentrated in vacuo to remove alcohol, acidified with concentrated sulfuric acid and extracted with ether. The ether was backwashed with sodium bicarbonate solution, dried and concentrated. Pentane was added to the concentrated solution to slight turbidity, whereupon crystallization occurred. The 7.4 grams (40 percent of theory) of 2′,2′-dimethyl-3′-hydroxy-4′-ethoxy-dihydropyrano (7,8:6′,5′)-coumarin so obtained was repeatedly recrystallized from an ether-pentane mixture to yield a purified product melting at 161–162 degrees centigrade, having an optical rotation (alpha)D of −59 degrees (c. 0.9), and ultraviolet absorption spectrum characteristics of lambda maximum at 325 m$\mu$ (4.15), lambda minimum at 266 m$\mu$ (3.18). The same compound was obtained when either 2′,2′-dimethyl-3′-(beta, beta-dimethyl-acrylyloxy)-4′-ethoxy-dihydropyrano(7,8:6′,5′)-coumarin, visnadin or dihydrosamidin was used as the starting material.

*Example 5.—Treatment with methanolic alkali at room temperature*

Samidin, when treated by the method described in Example 1 with methanolic alkali, yields 2′,2′-dimethyl-3′ (beta, beta-dimethyl-acrylyloxy) - 4′ - methoxy-dihydropyrano (7,8:6′,5′)-coumarin, melting at 158–159 degrees centigrade and having an optical rotation (alpha) D of +45 degrees. It is thus seen that this treatment with methanolic alkali produces a compound having a methoxy radical as the substituent on the 4′-position atom, instead of the ethoxy radical of the compound produced in Example 1.

*Example 6.—Treatment with methylalcoholic alkali at raised temperatures*

Samidin, when treated by the method described in Example 3 with 2 N sodium hydroxide in methyl alcohol, yields 2′,2′-dimethyl-3′-hydroxy - 4′ - methoxy-dihydropyrano (7,8:6′,5′)-coumarin. The properties by which this compound can be identified are: it melts at 158–159 degrees centigrade and has an optical rotation of +14 degrees±1 degree in alcohol.

Analysis.—Calculated for $C_{15}H_{16}O_5$: C, 65.19; H, 5.84; $OCH_3$, 11.23. Found: C, 65.46; H, 5.76; $OCH_3$, 11.17.

*Example 7.—Hot methanolic alkaline hydrolysis*

Twenty grams of samidin in 85 milliliters of methanol was refluxed with 85 milliliters of 2 N methanolic sodium hydroxide for 1.5 hours. The solution was then concentrated in vacuo, diluted with water, acidified and extracted with ether. The ether was backwashed with dilute sodium carbonate solution, then extracted with water, dried and concentrated. The residue was crystallized from ether-pentane to give 6.48 grams (44 percent) of 2′,2′-dimethyl-3′-hydroxy-4′-methoxy-dihydropyrano (7,8:6′,5′)-coumarin, melting at 158–159 degrees centigrade, and having an optical rotation (alpha) D +14 degrees (c. 1.04), and ultraviolet absorption spectrum characteristics of lambda maximum at 328 m$\mu$ (4.18), lambda minimum at 267 m$\mu$ (3.21).

Analysis.—Calculated for $C_{15}H_{16}O_5$ (276.3): C, 65.19; H, 5.84; $OCH_3$, 11.23. Found: C, 65.46; H, 5.76; $OCH_3$, 11.17.

The same alcohol was obtained when the hydrolysis was conducted with methanolic hydrochloric acid.

*Example 8.—Esterification of the hydroxyl compound of Example 3—the acetate and propionate*

The hydroxyl compound of Example 3 (290.3 grams; 1 mole) was dissolved in dry pyridine (113 milliliters; 112 grams) and to the solution was added acetic anhydride (113 milliliters 120 grams; 1.2 moles). The solution was heated on a steam bath for 50 minutes, three times the volume of warm water was added and heating was continued for another ten minutes. The mixture was then cooled and allowed to crystallize in the icebox. The crystals were collected, washed well with water and recrystallized once from 90 percent alcohol. The yield was 72–75 percent of analytically pure 2',2'-dimethyl-3'-acetoxy-4'-ethoxy-dihydropyrano (7,8:6',5')-coumarin. This compound melts at 170–172 degrees centigrade and has an optical rotation of −41.0±1 degree in alcohol. The ultraviolet absorption spectrum in alcoholic solution had a maximum at 325 m$\mu$ and a minimum at 264 m$\mu$.

Analysis.—Calculated for $C_{18}H_{20}O_6$: C, 65.05; H, 6.07. Found: C, 65.23; H, 6.03.

The corresponding propionate was prepared by the same process. It melts at 95–96 degrees centigrade and has an optical rotation of −32 degrees in alcohol. Its ultraviolet absorption spectrum in alcohol solution has a maximum at 325 m$\mu$ and a minimum at 264 m$\mu$.

Analysis.—Calculated for $C_{19}H_{22}O_6$: C, 65.88; H, 6.40. Found: C, 66.06; H, 6.04.

*Example 9.—Acetate of the hydroxyl compound of Example 3*

On acetylation with acetic acid anhydride in pyridine, 392 milligrams of 2',2'-dimethyl-3'-hydroxy-4'-ethoxy-dihydropyrano (7,8:6',5')-coumarin gave, after crystallization from aqueous methanol, 385 milligrams of monoacetate, melting at 170–172 degrees centigrade, having an optical rotation (alpha) D of −40.8 (c. 0.6 percent), and having ultraviolet absorption spectrum characteristics of lambda maximum 325 m$\mu$ (4.16), lambda minimum at 264 m$\mu$ (3.22).

Analysis.—Calculated for $C_{18}H_{20}O_6$ (332.3): C, 65.05; H, 6.07. Found: C, 65.23; H, 6.03. Molecular weight by Rast, 332.

*Example 10.—The acetate of the compound of Example 6*

The hydroxyl compound of Example 6 when treated with acetic anhydride as described in Example 7 yields 2',2'-dimethyl-3'-acetoxy-4'-methoxy-dihydropyrano (7,8:6',5')-coumarin. It melts at 147–149 degrees centigrade and has an optical rotation of +18±2 degrees in alcohol.

Analysis.—Calculated for $C_{17}H_{18}O_6$: C, 64.14; H, 5.70. Found: C, 64.12; H, 5.83.

*Example 11.—The acetate of the compound of Example 6*

Acetylation, as performed in Example 10, of 400 milligrams of the hydroxyl compound of Example 6, gave, after recrystallization from methanol, 318 milligrams of the monoacetate, melting at 147–149 degrees centigrade, having an optical rotation (alpha) D of +18.4 degrees (c. 1.29), and ultraviolet absorption spectrum characteristics of lambda maximum at 324 m$\mu$ (4.17), lambda minimum at 265 m$\mu$ (3.19).

Analysis.—Calculated for $C_{17}H_{18}O_6$ (318.31): C, 64.14; H, 5.70. Found: C, 64.12; H, 5.83.

*Example 12.—Reaction with acyl halides*

One part of the hydroxyl compound of Example 3 and 10 parts of redistilled valeryl chloride were refluxed for 90 minutes. After cooling, the solution was poured onto cracked ice, saturated with solid potassium carbonate, and after standing for one hour, it was dried over sodium sulfate, filtered and evaporated to dryness. Two crystallizations of the residue from ethyl acetatehexane (1:10) gave a 30 percent yield of pure 2',2'-dimethyl-3'-valeryloxy-4'-chloro-dihydropyrano (7,8:6',5')-coumarin. The compound melts at 148–149 degrees centigrade and has an optical rotation of −111±2 degrees in alcohol. In alcoholic solution it has an ultraviolet absorption spectrum with a maximum at 325 m$\mu$ and a minimum at 268 m$\mu$.

By reacting the hydroxyl compound of Example 3 with isovaleryl chloride according to a procedure similar to that disclosed in the previous paragraph, there was obtained 2,2'-dimethyl-3'-isovaleryloxy-4'-chloro-dihydropyrano (7,8:6',5')-coumarin, melting at 112–115 degrees centigrade and having an optical rotation of −122 degrees in alcohol. In alcoholic solution the ultraviolet absorption spectrum has a maximum at 325 m$\mu$ and a minimum at 258 m$\mu$.

Similarly, by reacting the hydroxyl compound of Example 3 with butyryl chloride according to a procedure similar to that employed in the previous paragraph there was obtained 2',2'-dimethyl-3'-butyryloxy-4'-chloro-dihydropyrano (7,8:6',5')-coumarin, melting at 113–116 degrees centigrade and having an optical rotation of −153 degrees in alcohol. In alcoholic solution, this chlorobutyrate has an ultraviolet absorption spectrum with a maximum at 325 m$\mu$ and a minimum at 258 m$\mu$.

By following the procedure of the foregoing examples using visnadin as a starting material instead of samidin, in Example 1, for instance, there is obtained 2',2'-dimethyl-3'-(alpha-methyl-butyryloxy)-4'-ethoxy - dihydropyrano (7,8:6',5')-coumarin having an optical rotation of +18 degrees in alcohol solution, being an oil and having an ultraviolet absorption spectrum in alcoholic solution showing a maximum at 322 m$\mu$ and a minimum at 262 m$\mu$. Dihydrosamidin yields, according to the same procedure, 2',2'-dimethyl-3'-isovaleryloxy-4'-ethoxy-dihydropyrano (7,8:6',5')-coumarin.

Similarly, by following the procedure of Example 5 using visnadin as a starting material, there is obtained 2',2'-dimethyl-3'-(alpha-methyl-butyryloxy)-4'-methoxy -dihydropyrano (7,8:6',5')-coumarin. Also, by following the procedure of Example 5, using dihydrosamidin as a starting material, there is obtained 2',2'-dimethyl-3'-isovaleryloxy-4'-methoxy-dihydropyrano (7,8:6',5')-coumarin.

Further, by employing the procedure of Example 6 using either visnadin or dihydrosamidin as the starting material, the same compound, 2',2'-dimethyl-3'-hydroxy-4'-methoxy-dihydropyrano(7,8:6',5')-coumarin, is obtained as in Example 6.

The hydroxyl compounds produced according to the procedures of Examples 3 and 6, can be treated according to the reactions of Examples 8 and 12 to yield respectively, the 3'-position ester derivatives and the 3'-position ester-4'-position halo derivatives.

Our procedure is also applicable to the use as starting materials of any 2',2'-dimethyl-3'-acyloxy-4'-alkoxy-dihydropyrano (7,8:6',5')-coumarin. Thus the 3'-position acyloxy group in the starting reactant may be aliphatic, as acetoxy, propionyloxy, butyryloxy, et cetera, or aromatic or araliphatic as benzoyloxy of phenacetoxy and such acyloxy group will then appear in the product of treatment as set forth in Example 1.

This application is a continuation-in-part of application Serial No. 473,042, filed December 3, 1954, by Eric Smith et al., and now abandoned.

Having thus described our invention, what we claim is:

1. The process of preparing a 2',2'-dimethyl-3'-substituted - 4' - lower - alkoxy-dihydropyrano-(7,8:6',5')-coumarin wherein the 3'-position substituent is selected from the group consisting of lower-alkanoyloxy and lower-alkenoyloxy which comprises mixing a 2',2'-dimethyl-3'-substituted-4'-substituted - dihydropyrano-(7,8:6',5')-coumarin wherein the 3'-position and the 4'-position substituents are independently selected from the group consisting of lower-alkanoyloxy and lower-alkenoyloxy with about 1 to 2 moles of an inorganic alkaline hydroxide dissolved in a lower alkanol, maintaining the reaction temperature below 25 degrees centigrade and recovering the said 2',2'-dimethyl-3'-substituted-4'-lower-alkoxy-dihydropyrano-(7,8:6',5')-coumarin thus formed from the reaction mixture.

2. The process of preparing a 2',2'-dimethyl-3'-loweralkanoyloxy - 4' - chloro - dihydropyrano-(7,8:6',5')-coumarin which comprises mixing a 2',2'-dimethyl-3'-hydroxy - 4' - lower-alkoxy-dihydropyrano-(7,8:6',5')-coumarin with a stoichiometric excess of a lower alkanoyl chloride, heating the reactants and recovering the said 2',2'-dimethyl-3'-lower-alkanoyloxy - 4' - chloro-dihydropyrano-(7,8:6',5')-coumarin thus formed from the reaction mixture.

3. 2',2'-dimethyl-3'-substituted-4'-substituted - dihydropyrano-(7,8:6',5')-coumarins wherein the 3'-position substituent is selected from the group consisting of lower-alkanoyloxy and lower alkenoyloxy and the 4'-position substituent is selected from the group consisting of lower-alkoxy and chloro.

4. 2',2'-dimethyl-3'-lower - alkanoyloxy-4-lower-alkoxy-dihydropyrano-(7,8:6',5')-coumarin.

5. 2',2'-dimethyl-3'-lower - alkanoyloxy-4-chloro-dihydropyrano-(7,8:6',5')-coumarin.

6. 2',2'-dimethyl-3'-lower - alkanoyloxy-4-lower-alkoxy-dihydropyrano-(7,8:6',5')-coumarin.

7. 2',2'-dimethyl-3'-(beta,beta-dimethyl acrylyloxy)-4'-ethoxy-dihydropyrano (7,8:6',5')-coumarin.

8. 2',2'-dimethyl-3'-acetoxy - 4' - ethoxy-dihydropyrano (7,8:6',5')-coumarin.

9. 2',2'-dimethyl- 3'-acetoxy-4'-methoxy-dihydropyrano (7,8:6',5')-coumarin.

10. 2',2'-dimethyl-3'-(alpha-methyl-butyryloxy)-4'-ethoxy-dihydropyrano (7,8:6',5')-coumarin.

11. 2',2'-dimethyl - 3' - valeryloxy - 4' - chloro-dihydropyrano (7,8:6',5')-coumarin.

References Cited in the file of this patent

Hutter et al.: Chem. Rev., vol. 48, pp. 543–525 (p. 554), 1951.
Smith et al.: Science, vol. 115, pp. 520–521 (1952).
Spath et al.: "Canadian J. of Chem.," vol. 31, No. 8, pp. 715–721 (August 1953).
Bencze et al.: "Experentia," vol. 12, pp. 137–8 (1956).